United States Patent Office 2,917,422
Patented Dec. 15, 1959

2,917,422

METHOD OF BONDING CORD TO RUBBER

Richard C. Waller, Cuyahoga Falls, Ohio, assignor, by mesne assignments, to The Goodyear Tire & Rubber Company, a corporation of Ohio No Drawing. Application July 16, 1953
Serial No. 368,534

9 Claims. (Cl. 154—90)

This invention relates to the treatment of yarns, cords, fabric and the like to be used in the manufacture of tires, belting and similar products. More particularly, the invention relates to the method of treating continuous-filament synthetic yarns or cords to be imbedded in rubber to form a cord to rubber assembly having a high degree of adhesive strength, greatly improved resistance to flex fatigue of the assembly and improved resistance to the diffusion of air through the axial extending interstices of the cord.

It is well known that before cords made of synthetic continuous-filament yarns can be incorporated in rubber articles, especially those to be subjected to drastic conditions of flexing or bending, the cords must be pretreated by coating and/or impregnating the cords with a substance that will bond well to both the rubber and the cord. Various substances having a base of latex, protein or resin forming materials which will produce good adhesion between cord and rubber are known in the art. However, adhesive strength is only one of several physical properties desirable in a rubber and cord assembly. Among other desirable physical properties are good cord strength, resistance to flex fatigue and, with the advent of tubeless tires, resistance to the diffusion of air axially along the length of the cord.

Although adhesive strength of a rubber and cord assembly is determined primarily by the type of adhesive or bonding agent used, other properties of the assembly are to a large extent influenced by the character of the cord or yarn and the method of applying the bonding agent.

For example, if cord having very fine filaments, and, therefore, a large number of filaments for a given strength, is to be bonded to rubber, it is difficult to transmit load from the rubber through the adhesive and outer layers of filaments to the innermost filaments of the yarn. The most practical manner of applying an adhesive, or bonding agent, is by dipping the yarn in a solution or dispersion of the bonding agent in a liquid vehicle. Methods of dipping yarn having a high number of filaments through one or more dips of relatively high solids concentration have not proved to be successful because, the solids in the solution tend to concentrate in the interstices of the outer filaments and bond the outer filaments together, particularly in a yarn of small filament size. When load is applied to an assembly of rubber and yarn dipped in this manner, the load transmitted by the bonding agent is in turn transmitted only to the outer filaments so that they become over-loaded and tend to fatigue and rupture, thus causing failure of those filaments that spread under continued load and results in premature failure of the product.

Conversely, if the high solids adhesive does penetrate deeply into the cord, over-loading of the outermost filaments is alleviated, but the interstices of the cord become completely filled with solids so that the fibers are cemented together and are not free to move relative to each other which results in loss of cord strength.

An object of this invention is to provide a method of securing improved resistance to flex fatigue and air diffusion in a continuous-filament cord and rubber assembly, while maintaining high cord strength and high bonding strength between the cord and rubber.

A further object of the present invention is to provide a method of securing a continuous-filament cord and rubber assembly, while maintaining high cord strength and high bonding strength between the cord and rubber.

A further object of the present invention is to provide a method of securing a continuous-filament cord and rubber assembly wherein a bonding agent is applied to the cord in a manner by which a gradient of concentrations of bonding agent toward the center of the cord is effected to improve flex fatigue resistance and resistance to the diffusion of air.

In order to set forth more clearly and concisely the purpose of the invention it will be described with reference to rayon cord; but, it is to be understood that any synthetic continuous-filament cord may be treated in accordance with the purpose of this invention including fabric made from such cord.

The preferred bonding agents or adhesives are those which consist of (1) a rubber latex, (2) an aqueous dispersion or solution of a resin, (3) an aqueous dispersion of a protein, or (4) mixtures combining two or more of the above ingredients. Examples of the protein material usable in these bonding agents are: casein, gelatin, wheat protein, animal glue, albumin, haemoglobin and preferably those having low viscosity such as fish glue or dried blood. Examples of the rubber latices which may be employed are natural rubber latex, the synthetic rubber latices such as those resulting from the polymerization of butadiene with styrene, e.g. GR–S, and butadiene with vinyl pyridine.

Examples of suitable resins which may be employed are thermosetting soluble aldehyde resins or an aldehyde and a reactant capable of forming a thermosetting resin with the aldehyde.

The aldehyde portion of the impregnant may be employed in its unreacted condition along with its complementary resin-forming reactant or it may be employed in a partially condensed condition. Examples of the aldehydes which may be used are formaldehyde, acetaldehyde, butyraldehyde and furfural. Examples of the complementary resin-forming reactants are the phenols or phenolic compounds such as phenol, cresol, xylenol, naphthol and resorcinol, the amines such as aniline, cyanamide and urea.

The term rubber, unless otherwise modified, is intended to be used in its generic sense to include natural rubber, compounded rubber, synthetic rubber, and the like.

The method of treating cords of the present invention consists of first, dipping the cord in a relaxed condition in a dilute solution of a bonding agent, maintaining the cords in a relaxed condition until the cord is thoroughly wet, compacting the cords by increasing the tension thereon, removing excess dilute solution, dipping the cord in a second solution of a bonding agent and drying the cord under the increased tension.

If the cord has the characteristic of shrinking in water, no attempt is made to prevent it during the initial dip. Since the cord is in a relaxed condition, or under very low tension during the initial dip, the volume of the interstices between the filaments of the cord is increased and, therefore, the degree of penetration, and the volume and amount of solids which the vehicle of the solution can carry into the interstices is increased. A tension of about .0015 gram per denier is preferred but the amount of tension may be varied up to .005 gram per denier. The low tension is maintained for the duration of the initial dipping operation. If the duration of the dipping operation is not long enough to obtain maximum wetting and penetration, the low tension may be maintained for a sufficient time thereafter to insure maximum wetting of the cord and penetration of the solution into the innermost interstices of the cord. Most commercially available cord will wet out in less than three minutes.

The solids concentration in the dilute predip is sufficient to leave a residue of bonding agent after the subsequent drying step which partially coats the innermost filaments of the cord but not of a concentration sufficient to totally fill the interstices thereof. This partial coating of the innermost filaments reduces interfilament abrasion after drying, in a manner hereafter explained, and increases the efficiency of the subsequent compacting and dipping steps. The applicant has discovered that a solids concentration of approximately 1 to 7% by weight provides, after subsequent treatment and drying, a gradient of concentrations of solids increasing outwardly from the innermost filaments. The residue, or coating, of solids which remain after drying between the innermost filaments, or in the interstices thereof, provide a coating or partial filler which keeps the filaments spaced from each other thereby reducing abrasion and friction between the filaments as they move relative to each other under operating conditions. However, the interstices are not filled to the extent of cementing the filaments together with resultant restriction of interfilament movement which would cause loss of cord strength and resistance to flex fatigue.

After the cord or yarn is dipped in the dilute predip and allowed to become thoroughly wet out, the cord is subjected to increased tension, while still wet, at least several times the tension applied during the first dip, preferably about .015 gram per denier. Increasing the tension of the wet cords straightens out or aligns the filaments into a lay more compact or dense than their original lay without elongating or stretching the cord beyond its original length. Because the cords are wetted or saturated by the dilute predip, the filaments are free to slide relative to each other and assume a normal lay without abrasion between the filaments. While maintaining the increased tension, the excess of dilute adhesive or bonding agent is wiped or drained off and the yarn is then subjected to a second application of bonding agent having a sufficient concentration of solids to produce an extremely good bond between rubber and the cord. The range of solids in the second dip is between 15% and 25% by weight, preferably aproximately 20%. Moreover, the preferred range of concentration of solids in the second dip, together with the compacting of the filaments and resultant reduction in the volume of the interstices, inhibits the diffusion of air axially through the cord by intermittently blocking or damming the axially extending interstices between the substantially parallel continuous filaments.

After the second dip is applied, the cord is heated to dry set or harden the bonding agent. The increased tension applied prior to the second dip is maintained during the drying operation. Thereafter, the cord is imbedded in commercially compounded rubber stock by well-known methods of calendering to form a cord and rubber assembly which may be used to build tires, belts and similar articles to be subsequently cured at a high pressure and at elevated temperature.

It is seen that the preferred range of solids in the predip, described above, provides after drying a coating on the cord, or partial filler in the internal interstices of the filaments which prevents interfilament abrasion but does not reduce the ability of the filaments to move relative to each other, so that the finished cord possesses very high resistance to flex fatigue. Secondly, the predip thoroughly wets out the cord and permits the filaments to be aligned into a more compact position prior to the second dip without interfilament abrasion of the filaments. The compacting step reduces the volume of the interstices of the cord and the preferred range of solids in the second dip intermittently dams the interstices of the cord to reduce the air diffusion rate axially through the cord, as well as, provide a bond between the cord and rubber.

Although best results are obtained by practicing the preferred embodiment of this invention as described above, improvements are effected in the resistance to the diffusion of air throughly axially extending interstices, and to flex fatigue of rubber and continuous-filament cord assemblies, but to a lesser degree, by modifying the preferred process to the extent that the filament compacting tension is applied during or subsequent to the second dip. However, in any event, the tension is increased prior to the drying operation so that the filaments are aligned while the cord is thoroughly wetted.

In order to more clearly illustrate the advantages and scope of this invention the following examples are given. It is understood, however, that the invention is not limited to these precise examples which are merely illustrative of this invention.

*Example 1*

A first dip containing an aqueous solution of a latex and a second dip containing an aqueous solution of resorcinol formaldehyde, sodium hydroxide and rubber latex hereinafter designated by the symbol (RFL) are prepared. The total solids content of the second dip is maintained during the tests at 20% by weight. In order to establish a control cord to which the test cords might be compared, rayon cord is dipped in the second dip, dried, imbedded in rubber, and tested for flex fatigue resistance and adhesion at 250° F. The flex fatigue resistance test is conducted by subjecting the rayon to rubber and cord assembly to a constant flexing or bending force and the number of cycles before separation of the cord from the rubber becomes the measure of flex fatigue resistance. A standard pull test at an elevated temperature is used to test adhesion strength of the bond in the cord and rubber assembly. The control cords exhibit a flex fatigue resistance of 80 kilocycles and an adhesion strength at 250° F. of 13 pounds. Rayon test cord of the same composition and construction as the control cord are then dipped, according to the teaching of this invention, in a dilute aqueous solution of a latex followed by a second dip having the same composition and the same solids concentration as the dip for the control cord. Thereafter, the samples are imbedded in rubber, dried and tested in the same manner as the control sample. The following data show that the samples dipped according to the present invention exhibit a slight increase in adhesion strength and up to 325% increase in flex fatigue resistance:

| Pre-Dip | Solids (percent) | Secondary Dip | Flex Fatigue (kc.) | Static Adh. @ 250°F. (lbs.) |
|---|---|---|---|---|
| Latex A | 0.2　0.5　1.0　2.5　5.0　Control | (RFL) 20% Solids. | 200　260　250　150　140　80 | 15　14　15　15　17　13 |

Additional rayon test cords, similar in composition and construction to the above control cord are dipped, imbedded in rubber and tested in the same manner as the above test cords but, a second type of latex is used in the first dip. As shown by the following data the test cords dipped according to this invention also have improved adhesion and greatly improved flex fatigue resistance over the control sample.

| Pre-Dip | Solids (percent) | Secondary Dip | Flex Fatigue (kc.) | Static Adh. @ 250°F. (lbs.) |
|---|---|---|---|---|
| Latex B | 0.5<br>1.0<br>2.5<br>5.0<br>10.0<br>Control | (RFL) 20% Solids. | 240<br>270<br>250<br>210<br>120<br>80 | 16<br>16<br>18<br>20<br>22<br>13 |

Example 2

Using the same control cord as that of Example 1, rayon test cords, of the same composition and construction as the control, are dipped in a dilute aqueous solution of a protein followed by a second dip of resorcinol formaldehyde, sodium hydroxide and latex (RFL), having a solids content of 20% by weight. The particular protein used in the pre-dip is blood and again the test cords dipped according to the present invention show improved adhesion strength and greatly improved flex fatigue resistance as shown by the following data:

| Pre-Dip | Solids (percent) | Secondary Dip | Flex Fatigue (kc.) | Static Adh. @ 250°F. (lbs.) |
|---|---|---|---|---|
| Blood | 1.0<br>2.5<br>5.0<br>Control | (RFL) 20% Solids. | 100<br>210<br>220<br>80 | 15<br>1<br>19<br>13 |

Additional test cords are pre-dipped in a dilute aqueous solution of blood and subjected to a second dip of an aqueous solution of blood and latex, having a total solids content of approximately 20% by weight. The test cords dipped in a dilute solution of a protein, followed by a concentrated solution of a protein and latex show improved adhesion strength and greatly improved fatigue resistance as indicated by the following data compared to a similar control cord dipped solely in a concentrated aqueous solution of blood and latex having a total solids concentration of 20% by weight. The latter sample gave a hot adhesion strength of 13 pounds and a flex fatigue resistance of 50 kilocycles:

| Pre-Dip | Solids (percent) | Secondary Dip | Flex Fatigue (kc.) | Static Adh. @ 250°F. (lbs.) |
|---|---|---|---|---|
| Blood | 1.0<br>2.5<br>5.0<br>Control | Blood Latex | 20<br>180<br>220<br>50 | 16<br>4<br>19<br>18 |

Example 3

A dilute aqueous solution of resorcinol formaldehyde and sodium hydroxide is prepared, having a total solids content of 2.5 by weight. Test cords are dipped in this dilute solution and then dipped in a second solution containing resorcinol formaldehyde, sodium hydroxide and latex, having a total solids concentration of 20% by weight. The test cords show a slight increase in adhesion strength and an increase in flex fatigue resistance of about 200% over control cords dipped in the second solution only.

Similar test cords are dipped in a dilute solids concentration of the aqueous solution used in the second dip of Example 1, followed by a second dip having the same adhesive as the first dip but of a total solids concentration of 20% by weight. The following data resulted:

| Pre-Dip | Solids (percent) | Secondary Dip | Flex Fatigue (kc.) | Static Adh. @ 250°F. (lbs.) |
|---|---|---|---|---|
| RFL | Control<br>1.0<br>2.5<br>5.0 | (RFL) 20% Solids. | 80<br>290<br>200<br>280 | 13<br>14<br>14<br>15 |

Several test cords of the same composition and construction were dipped in dilute solutions of the adhesive used as a second dip in Example 2, followed by a second dip of an aqueous solution of the adhesive used as a second dip above. The following data resulted:

| Pre-Dip | Solids (percent) | Secondary Dip | Flex Fatigue (kc.) | Static Adh. @ 250°F. (lbs.) |
|---|---|---|---|---|
| 5000R Blood Latex | Control<br>0.5<br>1.0<br>2.5<br>5.0 | (RFL) 20% Solids. | 0.5<br>2.2<br>2.5<br>2.2<br>2.2 | 13<br>12<br>14<br>16<br>17 |

It is seen that increasing the concentration of the first dip, followed by a second adhesive dip of the same or different composition materially increases the adhesive strength and very greatly increases flex fatigue resistance.

In order to illustrate the importance of maintaining the cord in a relaxed condition, or under low tension, during the initial dip of the present invention, similar test cords are dipped according to the present invention and compared with cords similarly dipped except that the tension is materially increased during the first dip. Little change is noted in the adhesion strength but the cords pre-dipped under high tension show a flex fatigue resistance of 50% less than the control cord pre-dipped under low tension according to this invention.

In order to illustrate the advantage of the present invention over conventional dipping methods with respect to the diffusion of air axially through the cord, a series of control cords are dipped in a single dip of a highly concentrated adhesive, dried, imbedded in rubber, and a measure of the volume of air which passes axially through the cord per unit of time under 20 pounds pressure is made. Similar tests were conducted on test cords dipped according to the present invention. 100% to 600% more air is diffused through the single-dipped samples than through the double-dipped samples and, it is noted that as the compacting tension applied before the second dip is increased, the diffusion of air is decreased, whereas, the converse is true for the control cords.

It is of primary importance to the successful practice of this invention, that the cord is not dried between the first and second applications of bonding agents. Drying the cord at that time materially decreases flex fatigue resistance because the filaments will be fixed in an abnormal lay by the hardened bonding agent. Moreover, of course, the advantage of the cord being in a wet condition before application of the increased tension and second dip will be lost. Drying the cord between the first and second dip will decrease flex fatigue resistance as much as 95% less than cord dipped in accordance with the teaching of this invention.

From the foregoing, it is seen that this invention provides an economical method of treating cord, yarns or fabric to improve not only the bonding or adhesion strength thereof to rubber, but makes possible the preparation of cord and rubber assemblies having uniformly higher resistance to flex fatigue and to the diffusion of air axially through the cord without impairing other physical properties of the assembly. The cord imparts a longer useful life to articles such as tires, belts and the like and, because of the high resistance to the diffusion of air, the cord is particularly useful in the making of tubeless tires.

While certain representative embodiments and details have been shown for the purpose of illustrating the invention, it will be apparent to those skilled in the art that various changes and modifications may be made therein without departing from the spirit or scope of the invention.

I claim:

1. A method of bonding cord to rubber which comprises dipping the cord in a relaxed condition in a dilute, aqueous solution of a bonding agent, maintaining the cord in relaxed condition to permit the solution to wet the cord and penetrate the interstices of the innermost filaments, said dilute solution having a solids content up to approximately 7% by weight to partially fill the interstices of the innermost filaments of the cord to prevent inter-filament abrasion after subsequent drying, applying increased tension to the wet cord to align and compact the filaments into a dense lay so that the volume of the interstices is decreased, applying a second aqueous solution of a bonding agent to the wet cord while maintaining the increased tension, said second solution having a greater solids concentration than the dilute solution to provide a cord to rubber bond, drying the wet cord while maintaining the increased tension and imbedding the dried cord in rubber.

2. A method of bonding cord to rubber as claimed in claim 1 in which a tension of not more than .005 grams per denier is applied to the cord during dipping in said dilute solution.

3. A method of bonding cord to rubber as claimed in claim 1 in which the solids concentration of the second solution is between 15% and 25% by weight.

4. A method of bonding cord to rubber as claimed in claim 1 in which the tension is increased up to approximately .015 gram per denier to align and compact the filaments prior to applying said second aqueous solution.

5. A method of bonding cord to rubber as claimed in claim 2 in which the tension is increased up to approximately .015 gram per denier to align and compact the filaments prior to applying said second aqueous solution.

6. A method of bonding cord to rubber as claimed in claim 2 in which the solids concentration of the second aqueous solution is between 15% and 25% by weight.

7. A method of bonding cord to rubber as claimed in claim 4 in which the solids concentration of the second aqueous solution is between 15% and 25% by weight.

8. A method of bonding cord to rubber as claimed in claim 7 in which a tension of not more than .005 gram per denier is applied to the cord during dipping in the dilute solution.

9. A method of bonding cord to rubber which comprises dipping the cord in a relaxed condition in a dilute, aqueous solution of a bonding agent, maintaining the cords in relaxed condition to permit the solution to wet the cord and penetrate the interstices of the innermost filaments, said solution having a solids concentration up to approximately 7% by weight to partially fill the interstices of the innermost filaments of the cord after subsequent drying, applying a second aqueous solution of a bonding agent to the wet cord having a greater solids concentration than the dilute solution to provide a good cord to rubber bond, applying increased tension to the wet cord, said increased tension being greater than the tension applied during the application of the dilute solution, drying the wet cord under said greater tension and imbedding the dried cord in rubber.

References Cited in the file of this patent

UNITED STATES PATENTS

| Number | Name | Date |
|---|---|---|
| 2,128,229 | Charch et al. | Aug. 30, 1938 |
| 2,220,958 | Jennings | Nov. 12, 1940 |
| 2,233,274 | Teague | Feb. 25, 1941 |
| 2,314,998 | Lessig et al. | Mar. 30, 1943 |
| 2,381,398 | Bosomworth | Aug. 7, 1945 |
| 2,423,294 | Colesworthy | July 1, 1947 |
| 2,514,187 | Bosomworth | July 4, 1950 |
| 2,627,296 | Secrest | Feb. 3, 1953 |
| 2,722,486 | Thorp | Nov. 1, 1955 |
| 2,724,657 | Skalkeas | Nov. 22, 1955 |

UNITED STATES PATENT OFFICE
CERTIFICATE OF CORRECTION

Patent No. 2,917,422                                                December 15, 1959

Richard C. Waller

It is hereby certified that error appears in the printed specification of the above numbered patent requiring correction and that the said Letters Patent should read as corrected below.

Column 2, line 8, beginning with the words "A further" strike out all to and including "and rubber." in line 11; column 4, line 13, for "throughly" read -- through --; column 5, line 33, in the table, fifth column thereof, second item, for "1" read -- 16 --.

Signed and sealed this 31st day of May 1960.

(SEAL)
Attest:

KARL H. AXLINE                                          ROBERT C. WATSON
Attesting Officer                                     Commissioner of Patents